Figure 1:
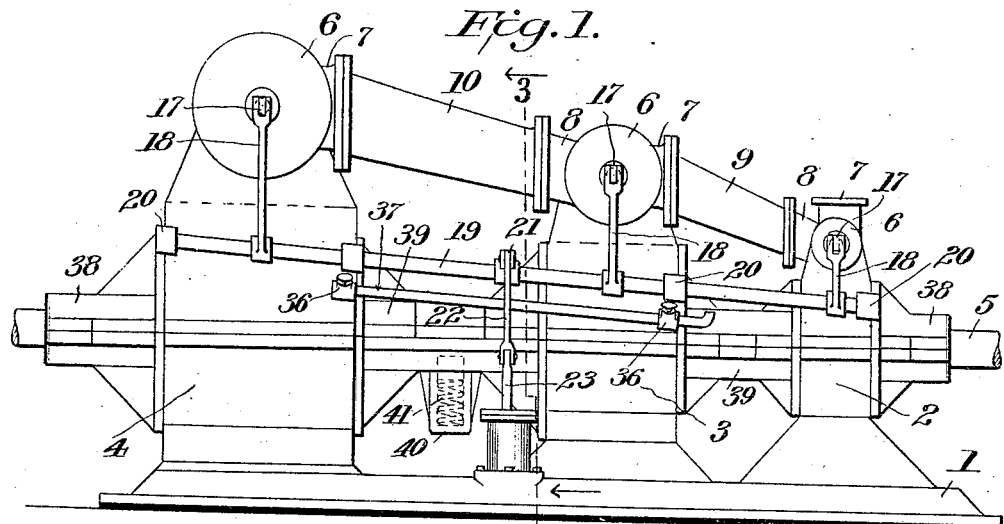

C. T. OWENS.
TURBINE.
APPLICATION FILED NOV. 5, 1912.

1,074,738.

Patented Oct. 7, 1913.

2 SHEETS—SHEET 1.

Witnesses
C. N. Walker
G. Fred Baker

Inventor
Charles T. Owens

By Edward W. Holmes
Attorney

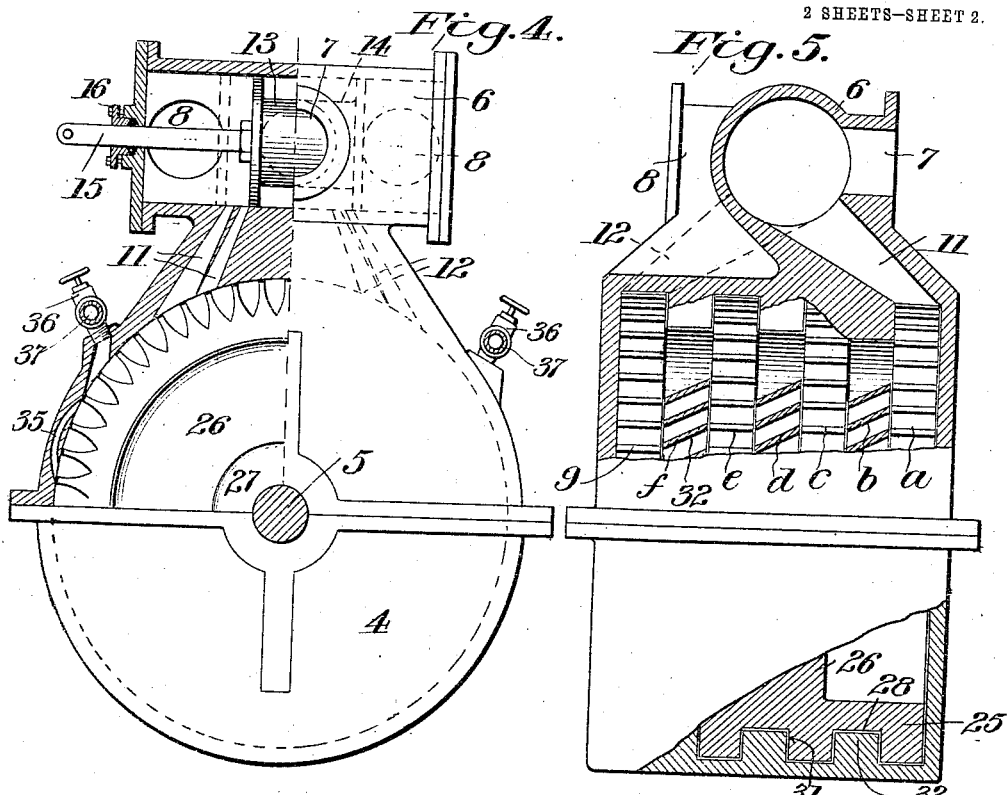

UNITED STATES PATENT OFFICE.

CHARLES T. OWENS, OF BALTIMORE, MARYLAND.

TURBINE.

1,074,738.

Specification of Letters Patent.

Patented Oct. 7, 1913.

Application filed November 5, 1912. Serial No. 729,613.

*To all whom it may concern:*

Be it known that I, CHARLES T. OWENS, a citizen of the United States, residing at Baltimore, in the State of Maryland, have invented certain new and useful Improvements in Turbine-Engines, of which the following is a specification.

This invention relates to turbines, and in particular to turbines of the circumferential flow type.

The invention has for its object to provide a multistage turbine having improved means for the removal of exhaust from one part of the rotor and the re-admission thereof to another part of the rotor in such manner as to utilize the expansion of the steam as advantageously as possible; to provide improved means for controlling all of the inlets and exhausts from a single point; to dispense with removable parts, so far as the inlet and exhaust ports are concerned; and to enable the space between the rotor and the stator to be adjusted so that leakage of steam may be minimized or avoided and the relative positions of the parts regulated.

The improved turbine has vanes carried by the rotor, the edges of which are arranged parallel to the axis of the main shaft, said vanes coöperating with vanes carried by the casing, the edges of said vanes being arranged at an angle to the axis of the main shaft. In other words we have a series of vanes parallel to the axis of the main shaft, coöperating with another series of vanes which are not parallel to the axis of the main shaft, and both radially disposed to the axis.

Another feature of my invention is the arrangement of the inlet and exhaust ports, and the controlling valves for the same, for each stage or rotor and its coöperating cylinder of the engine. The steam inlets are single openings leading to the valve chambers, while the exhaust ports of each section consist of a plurality of openings which combine and enter the single intake port of the next succeeding valve chamber of the engine. All of the valves are operated in unison by a single crank shaft, said shaft being rocked by a piston under the control of the operator.

By a reference to the first two figures of the drawing it will be seen that I have produced a very powerful engine in the smallest practical space, and the whole engine is mounted upon a single base.

The invention now will be described more fully with reference to the accompanying drawings forming a part of this specification, in which:

Figure 2:
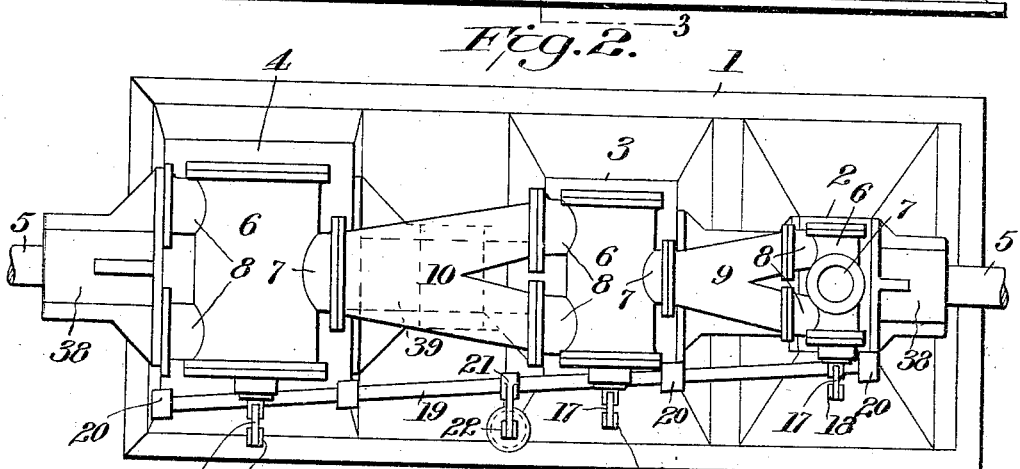
Figure 3:
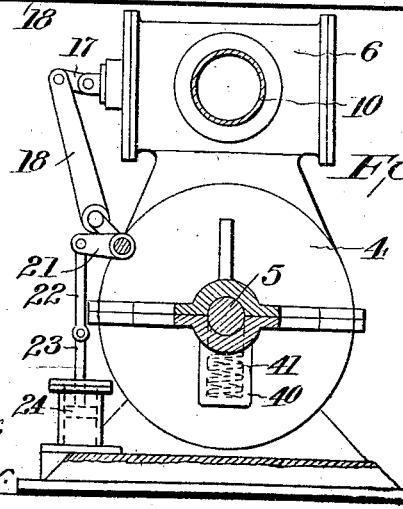

Figure 1 is a side elevation of my improved turbine engine; Fig. 2, is a plan view thereof; Fig. 3, is a section taken on the line 3—3 of Fig. 1; Fig. 4, is a detail sectional view showing the connection between the cylinder and its valve chamber; Fig. 5, is a detail view of the parts shown in Fig. 4 but taken at right angles to the same; Fig. 6, is a detail plan view of the parts shown in Fig. 4; Figs. 7, 8 and 9, are detail views of the rotor, the vanes carried by the rotor and the coöperating vanes carried by the casing respectively; Fig. 10, is a detail view illustrating the manner in which the vanes of the rotor coöperate with the vanes of the casing.

Similar characters of reference designate corresponding parts in the several figures of the drawing.

In the construction of my invention I provide a base 1, upon which base are mounted the cylinders 2, 3 and 4 of my engine. As shown in the drawings the cylinder 2 is the high-pressure cylinder, the cylinder 3 may be termed the intermediate pressure cylinder, and the cylinder 4 the low-pressure cylinder. In each of these cylinders is mounted a rotor, each of said rotors being secured to a common main driving-shaft 5, said shaft being the main shaft of the engine. Suitable pulleys or gears may be attached to this shaft 5 for the purpose of imparting motion to machines of various kinds. Upon each of the cylinders is mounted a valve casing 6, said casing being shown in detail in Figs. 4, 5 and 6 of the drawings. Each valve casing has a single inlet port 7 and a plurality of outlet ports 8, two of such outlet ports being shown in the drawings. In Fig. 1 of the drawings, I have shown the inlet port of the high-pressure cylinder at the top of the valve casing, while the inlet ports of the intermediate and low-pressure valve casings are shown on the side, and all of the outlet or discharge ports are shown on the side; I do not desire to limit myself to this particular disposition of the inlet and outlet ports, as it is obvious the ports may be placed in several different positions with relation to the valve casings without affecting the scope of my invention. As shown in the drawings the inlet ports of the valve chambers are in the center, while the exhaust or outlet ports are at the end of the same. The exhaust ports of the high-pressure cylinder valve casing are connected to the inlet port of the intermediate valve cylinder by a Y connection 9, and the exhaust ports of the intermediate valve casing are connected to the inlet port of the low-pressure valve casing by a similar Y connection 10.

Leading from each valve-chamber to the cylinders are ports 11 and 12 arranged in multiple, and it will be seen from Figs. 4, 5 and 6 of the drawings that the ports 11 lead into one end of the cylinders, while the ports 12 lead into the other end of said cylinders. It will also be seen that the ports 11 open into the cylinders on a tangent, and at the opposite side to that which the ports 12 enter in a similar manner. The arrangement is such that if steam is admitted through the ports 11 it will turn the rotor in the direction shown by the arrow in Fig. 4 of the drawing, while if steam is admitted through the ports 12 it will turn the rotor in the opposite direction. It will also be seen from Figs. 4, 5 and 6 of the drawings that if steam is admitted through the ports 11 to the cylinder, it will exhaust from the cylinder through the ports 12. And conversely, if steam is admitted through the ports 12 to the cylinder it will exhaust through the ports 11 into the valve chamber and through the outlet port 8, which is the course it would take when the valve is in the position shown in Fig. 4 of the drawings. The ports 11 and 12 are similarly placed with relation to the valve casings and cylinders, for the high, intermediate and low pressure elements of my engine.

Each valve casing houses a piston valve 13, the periphery of which is cut away to form a circumferential groove 14 around the same. As shown in Fig. 4 the groove 14 must be of sufficient width to cover the inlet port, and at the same time one or the other of the ports 11 or 12. By reference to the above figure it will be seen that steam can enter the inlet port 7, pass around the valve in the groove 14 and into the cylinder through the ports 12, and then exhaust through the ports 11. If the valve is shifted to the position shown in dotted lines the steam can take a reverse course, and exhaust out of the opposite end of the valve casing. To each of the valves is attached a valve stem 15 which projects through a suitable packing gland 16 in the end of the casing, and these valve stems are connected by a link 17 with cranks 18 attached to a rock-shaft 19 suitably journaled in bearings 20 secured to the cylinder casings. To the rock-shaft 19 is fixed a crank arm 21 which is connected by a pitman 22 with a piston rod 23 of a piston 24 in a cylinder under the immediate control of the engine operator. From the foregoing it will readily be seen that a movement of the rock-shaft 19 which will throw all of the valves in the valve chests to a position the reverse of the one they occupy, a reversal of the engine will take place. In large engines of this character it is necessary that the valves be moved quickly, and in unison, which requires considerable power, hence the necessity of having a power actuated crank shaft for doing this work.

As previously referred to each of the cylinders 2, 3 and 4 house a rotor, each rotor being keyed to the main shaft 5 of the engine, the construction of which I will now describe.

Each rotor consists of a cylinder 25 secured by a web 26 to a hub 27. The periphery of the cylinder has a plurality of grooves 28 cut therein. The ribs left on the periphery of the rotor are cut into teeth, the edges of which are parallel to the axis of the main shaft. The sides of the teeth 29 are curved as shown at 30 in Figs. 4 and 7 of the drawings, making it possible for the steam to hit said teeth much squarer as it enters the cylinder. The inner circumference of the cylinders is provided with grooves 31 through which the teeth 29 of the rotor travel. The cylinder is also provided with rings having teeth cut in them on its inner wall, and these teeth project into the grooves cut into the periphery of the rotor, and co-act with the teeth formed by the periphery of the rotor. As shown in Figs. 5 and 9 the teeth on the inner wall of the cylinders are arranged at an angle to the axis of the main shaft. The teeth 32 have curved walls 33 similar to the curved sides on the teeth on the rotor. By reference to Fig. 5 of the drawings the steam enters the cylinder through the port 11 and acts against the teeth "a" of the rotor. As the steam continues to enter the cylinder the rotor begins to move and a portion of the steam works through the side of the teeth and is deflected by the teeth "b" of the cylinder, against the next row of teeth "c" of the rotor. The steam in like manner passes from the teeth "c" of the rotor through the teeth "d" of the cylinder and against the teeth "e" of the rotor. A similar passage of the steam takes place from the teeth "e" of the rotor through the teeth "f" of the casing and into the pockets between the last row of teeth "g" of the rotor. As the rotor is continually traveling around the steam will exhaust from the last row of teeth, or rather from the pockets between the same through the port 12 and out through one of the exhaust ports of the valve casing. Again referring to Fig. 5 of the drawings it will be seen that the inclined teeth on the inner wall of the cylinder direct the steam from one row of teeth on the rotor against the walls of the next succeeding row of teeth on the rotor thus assisting the travel of the same. It will also be seen from the above figure that the steam enters the row of teeth on one end of the rotor, and exhausts from the row of teeth on the other end of the rotor; this holds good when the engine is traveling in either direction. As the steam is continually entering the cylinder there is a constant flow from the first to the last rows of teeth on the rotor and this flow is being forced against the walls of said teeth by the inclined teeth on the inner wall of the cylinders. The rotors for the high, intermediate and low pressure cylinders are similarly constructed, but I do not limit myself to the particular number of rows of teeth shown on the drawings. The inner walls of each cylinder of my engine are similarly constructed but I do not desire to limit myself to the precise angle of the teeth as shown on the drawings. For instance, in different sizes of engines it may be desirable to set these teeth at a greater or less angle with respect to the axis of the main shaft.

The inner walls of the cylinders have arranged therein by-passes 35, said by-passes being arranged in the grooves between the teeth on the cylinder and assist in directing the steam squarely against the blades of the rotor.

To assist in starting the engine I provide starting valves 36 on the intermediate and low pressure cylinders. These valves lead from live steam pipes 37, and direct the steam against the blades of the rotor in each of the above mentioned cylinders. The starting valves 36 assist materially in some cases in reversing the engine.

The main shaft 5 is journaled in bearings 38 at the ends of the engine and intermediate bearings 39 between the cylinders. These bearings are bolted firmly to the cylinder heads and make a rigid and easy-running journal for the main shaft. On the bearing between the intermediate and low pressure cylinders I have shown a depending pocket 40 which houses a strong helical spring 41, said spring bearing against the bushing in the bearing preventing any wear that may occur in case the bushing becomes loose. This or a similar construction would be used on all bearings. The cylinders of my engine are made of upper and lower sections firmly bolted together with a soft metal filler plate between the meeting edges of the same. These filler plates or liners may be removed and thinner ones substituted in case any wear has occurred necessitating such action. All of the rotors of my engine are constructed to run free in the cylinders and without any contact therewith; consequently the question of wear is not an important one in the construction of this machine.

The operation of my invention is as follows: Steam enters the high pressure cylinder from a suitable source of supply, circulates through the same as previously described and exhausts through one of the exhaust ports of the valve casing of said cylinder. It then passes through the pipe or connection 9 into the valve chamber of the intermediate cylinder and pursues a course through the same as previously described in this specification. The steam then passes from the exhaust port of the valve casing of the intermediate cylinder to the valve casing of the low pressure cylinder, circulating through the same, and exhausting through one of the ports of said valve casing.

It will be seen from Figs. 1 and 2 of the drawings that the steam can pass from either one of the exhaust ports of the valve casings on the high or intermediate pressure cylinders to the inlet port of the next adjacent valve cylinder. Of course the direction in which the engine is rotating will regulate the particular exhaust port from which the steam leaves the valve casing.

I do not desire to limit myself to the exact construction or dimensions shown on the drawings, or to three rotors, as two or four may in some cases be of greater efficiency, and many modifications may be made without departing from the spirit of my invention.

Having thus described my invention, what I desire to claim and protect by Letters-Patent is:

1. A plurality of turbines arranged on a shaft common to all of them, a single inlet port leading to the valve of each turbine, a plurality of exhaust ports leading from the valve of each turbine and means for conducting the steam from the exhaust ports of any turbine to the inlet port of the next succeeding turbine.

2. A multistage steam turbine engine having cylindrical casings each casing provided with internal circumferential rows of vanes disposed at an angle to the axis of the rotor shaft, each casing containing a rotor fixed to a common shaft, the rotor being provided with peripheral rows of vanes, said vanes being parallel to the axis of the main shaft, tangentially arranged ports leading to one end of each rotor, and tangentially arranged ports leading from the opposite end of said rotor, a valve chamber having a single inlet port and a plurality of outlet ports attached to each stage of the turbine, and means for conveying the exhaust from the several outlet ports of each stage to the single inlet port of each next succeeding stage, valves operating in each valve chamber, and means for operating all of said valves in unison.

3. A multistage circumferential flow turbine the stages of which have oppositely disposed ports arranged at the ends of the rotor, circumferential rows of blades arranged at an angle to the axis of the shaft, and a rotor co-acting therewith having peripheral rows of blades each blade parallel with the axis of the shaft, supplemental starting valves arranged to direct steam against the vanes of the rotors of the intermediate and low pressure cylinders.

4. In a multistage circumferential turbine, each stage having a valve chamber having inlet and outlet ports, oppositely disposed ports connecting said valve chamber with the turbine, a sliding piston valve in each valve casing, said sliding valve being actuated from a counter shaft disposed at an angle to the main shaft of the turbine, and a piston for rocking said counter shaft substantially as described.

5. A multistage circumferential turbine, each stage having oppositely disposed ports, said ports being at the opposite ends thereof, each stage having circumferential rows of tapered vanes attached to the inner wall of the casing, said vanes being arranged at an angle to the axis of the main shaft, a rotor having circumferential rows of tapered vanes, said vanes being parallel to the axis of the main shaft, the sides of said vanes being curved; curved ports in the casing and directed against the vanes of the rotor.

6. A multistage circumferential flow turbine the stages of which have oppositely disposed ports alternating as inlet and outlet ports leading from a valve chamber, said valve chamber having a single inlet port and a plurality of outlet ports.

7. A multistage circumferential flow turbine the stages of which have oppositely disposed ports arranged at the ends of the rotor alternating as inlet and outlet ports, circumferential rows of blades arranged at angle to the axle of the shaft, and a rotor co-acting therewith having peripheral rows of blades each blade parallel with the axis of the shaft, and supplemental starting valves arranged to direct steam against the vanes of the rotors of the intermediate and low pressure cylinders.

In testimony whereof I affix my signature in presence of two witnesses.

CHARLES T. OWENS.

Witnesses:
  G. F. BAKER,
  JAS. H. BLACKWOOD.

---

Copies of this patent may be obtained for five cents each, by addressing the "Commissioner of Patents. Washington, D. C."